(12) United States Patent
Golin

(10) Patent No.: US 6,845,129 B2
(45) Date of Patent: Jan. 18, 2005

(54) CONTROLLING A VIDEO-BUFFER-VERIFIER BUFFER USING AN MPEG-LIKE ENCODER

(75) Inventor: Stuart Jay Golin, Piscataway, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 752 days.

(21) Appl. No.: 09/774,311

(22) Filed: Jan. 31, 2001

(65) Prior Publication Data

US 2002/0101921 A1 Aug. 1, 2002

(51) Int. Cl.[7] .................. H04N 7/12; H04N 11/02
(52) U.S. Cl. .................. 375/240.02; 375/240.05; 375/240.07
(58) Field of Search ............ 375/240.01, 240.02, 375/240.05, 240.07, 240.12

(56) References Cited

U.S. PATENT DOCUMENTS

| | | | | |
|---|---|---|---|---|
| 5,461,420 A | * | 10/1995 | Yonemitsu et al. | 375/240.15 |
| 5,652,627 A | * | 7/1997 | Allen | 348/497 |
| 5,793,436 A | * | 8/1998 | Kim | 348/447 |
| 6,044,396 A | * | 3/2000 | Adams | 725/95 |
| 6,212,233 B1 | * | 4/2001 | Alexandre et al. | 375/240.03 |
| 6,459,811 B1 | * | 10/2002 | Hurst, Jr. | 382/232 |

* cited by examiner

*Primary Examiner*—Chris Kelley
*Assistant Examiner*—Erick Rekstad

(57) ABSTRACT

Possible overflow of a video buffer verifier (VBV) buffer employed in MPEG-like video encoders is prevented by controlling bits being drained from a video encoder buffer (eBuff). Specifically, a number of bits in the encoder buffer is determined when a last prior picture (pic n−1) ends, or when it should end. This number of bits (maxBits) is the maximum number of bits to be read from the encoder buffer and written to the remote decoder before a prescribed time T(n). When maxBits has been read from the encoder buffer and written to the decoder, the writing of bits to the remote decoder is stopped until the process is reset. If the prior picture ends early, maxBits is defined as being the number of bits in the encoder buffer at an expected time (Texp) that the picture should have ended less the number of bits written into the encoder buffer between the time the prior picture actually ended and the expected time for it to end, i.e., Texp. If the prior picture is late, i.e., ends after the expected time for it to end, maxBits is defined as being the number of bits in the encoder buffer at the actual time the prior picture ended. During the interval from the expected time the prior picture should have ended, i.e., Texp, and the actual time that it ended, the maxBits mechanism is essentially disabled. That is, bits are allowed to be read out of the encoder buffer and written to the decoder.

14 Claims, 2 Drawing Sheets

CALCULATE maxBITS

CONTROLLING A VIDEO-BUFFER-VERIFIER BUFFER USING AN MPEG-LIKE ENCODER

RELATED APPLICATION

U.S. patent application Ser. No. 09/539,059 was filed on Mar. 30, 2000, now U.S. Pat. No. 6,674,797 issued Jan. 6, 2004, and is assigned to the assignee of this application.

TECHNICAL FIELD

This invention relates to video encoding and, more particularly, to ensuring integrity of the buffer of a video buffer verifier in an MPEG-like video encoder.

BACKGROUND OF THE INVENTION

The Moving Picture Experts Group (MPEG) has the concept of a Video Buffer Verifier, or VBV, which is a hypothetical decoder conceptually connected to the output of an encoder. When it is time for the VBV to decode a picture, it instantaneously removes it from its buffer, the VBV buffer. This VBV buffer must never overflow or underflow in normal operation. If it overflows, data is lost. If it underflows, video data is not present when needed to decode a picture.

A Bit-Rate Controller (BRC) function of a corresponding encoder is responsible for ensuring integrity of the VBV buffer. The BRC cannot do this directly, since it lacks direct access to the VBV buffer; instead it monitors the fullness of mBuff, its model of the VBV buffer.

For this reason, the overall encoding system is responsible for ensuring that mBuff correctly represents the VBV buffer. Any number of factors can cause these buffers to differ, and such differences can accumulate, causing the VBV buffer to overflow or underflow.

A specific problem relates to possible buffer overflow during processing of film to be played on television. When employing certain encoders, it is normal to complete encoding a picture ("pic") early. In the film processing mode, however, the encoder may complete encoding of the picture a full field time early. When a picture is encoded early, the encoder may begin encoding the next picture early. When such encoding begins early, bits are put into the encoder buffer early, which creates a risk of writing them to a remote decoder prematurely. Even when encoding begins on time, bits may be written prematurely. This may cause the VBV buffer to overflow.

SUMMARY OF THE INVENTION

Problems regarding overflow of a video buffer verifier (VBV) buffer employed in MPEG-like video encoders are addressed by controlling bits being drained from a video encoder buffer (eBuff). Specifically, a number of bits in the encoder buffer is determined when a last prior picture (pic n−1) ends, or when it should end. This number of bits (maxBits) is the maximum number of bits to be read from the encoder buffer and written to the remote decoder before a prescribed time T(n). When maxBits has been read from the encoder buffer and written to the decoder, the writing of bits to the remote decoder is stopped until the process is reset.

If the prior picture ends early, maxBits is defined as being the number of bits in the encoder buffer at an expected time (Texp) that the picture should have ended less the number of bits written into the encoder buffer between the time the prior picture actually ended and the expected time for it to end, i.e., Texp.

If the prior picture is late, i.e., ends after the expected time for it to end, maxBits is defined as being the number of bits in the encoder buffer at the actual time the prior picture ended. During the interval from the expected time the prior picture should have ended, i.e., Texp, and the actual time that it ended, the maxBits mechanism is essentially disabled. That is, bits are allowed to be read out of the encoder buffer and written to the decoder.

DETAILED DESCRIPTION

A. Theoretical Discussion

Figure 1:
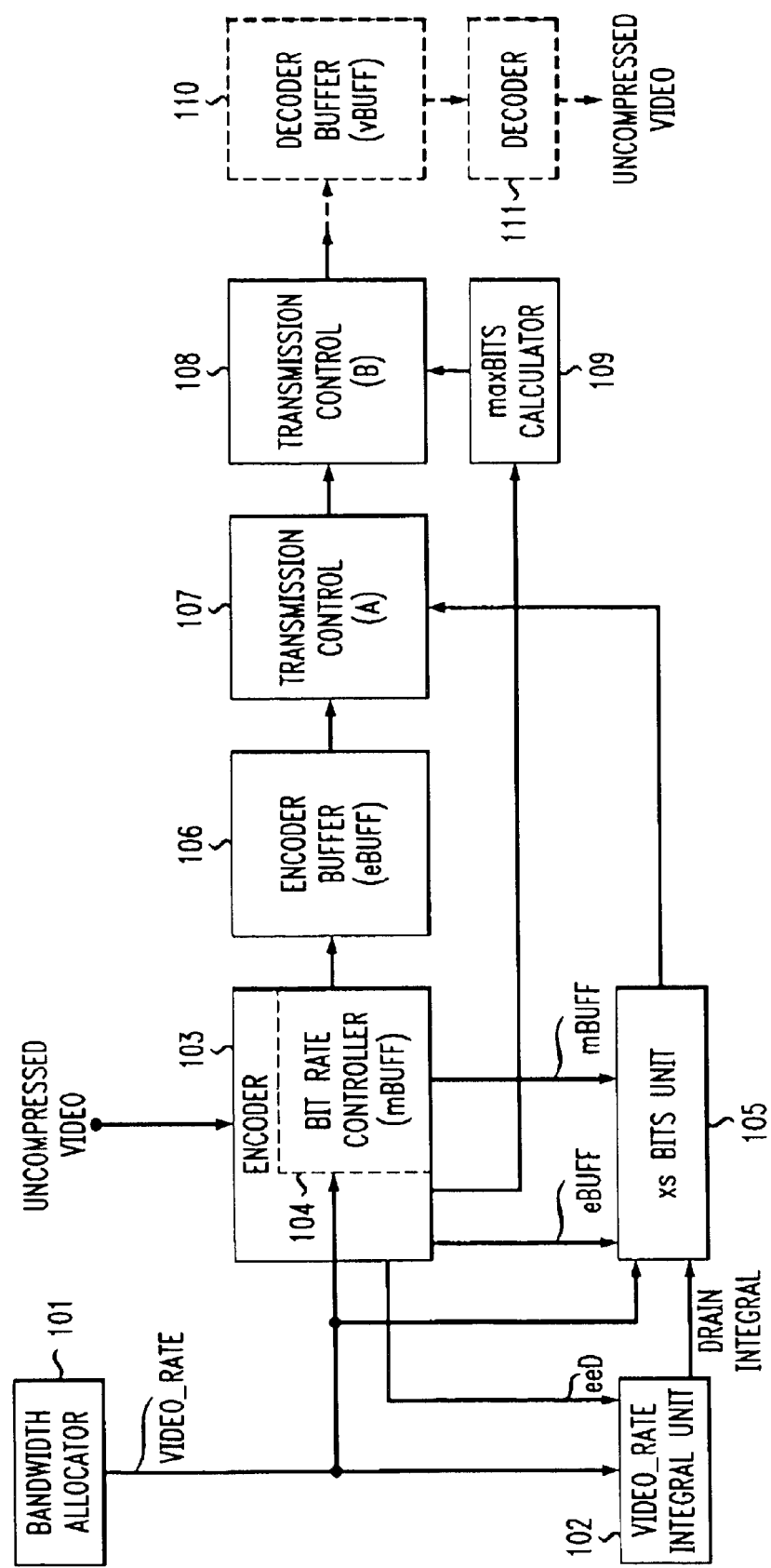
FIG. 1 shows, in simplified block diagram form, an MPEG-like encoder including one embodiment of the invention.

In an MPEG-like encoder there are three buffers of interest, namely:

(1) vBuff, the VBV buffer, as deduced from the bit stream. Also referred to as the decoder's buffer;

(2) mBuff, the encoder's model of the VBV buffer; and (3) eBuff, the encoder's buffer.

These symbols will represent not only the buffers, but also the number of bits they contain at any given time. The meaning will be clear from the context of the description below.

A bit rate controller, BRC, is an encoder function that models vBuff to ensure its integrity. The BRC tries to adjust the quantization so that mBuff, its model of vBuff, is never in danger of overflow or underflow. If mBuff is about to overflow, the BRC can reduce the effective video coding rate by stuffing zero-bytes before start codes; if mBuff is about to underflow, the BRC goes into "panic" mode, and stops generating bits.

Note, there is a delay between the encoding and decoding of picture n, known as the end-to-end-buffer-delay, eeD. This delay must be constant for the frame rate to be constant. Also, picture-end is assumed to occur slightly before a field sync, and is given the time of that sync.

The rate at which bits are drained from the encoder's buffer, the drain_rate, should equal video_rate, the video coding rate. Metering refers to the mechanism that adjusts the instantaneous drain-rate to satisfy this requirement.

When it is time for the VBV to decode a picture, this idealized decoder instantaneously removes all of the bits of that picture (pic) from its buffer, and instantaneously decodes it.

An ideal encoder is useful in understanding a real one. While the MPEG specification doesn't define an ideal encoder, one is pretty-much implied by MPEG literature. As noted above, the ideal encoder has an encoder buffer, eBuff, which is as large as vBuff. It instantaneously encodes a picture (pic) and puts the bits in eBuff. If picture n (pic n) is decoded at time T(n)+eeD, then it is encoded at time T(n). For purposes of the discussion here, the importance of eeD is not its value, but the fact that it precisely defines T(n). (The value of eeD is sizeof (vBuff)/video_rate). It is further noted that the determination of T(n)+eeD is defined by the MPEG-2 specification, ISO/IEC 13818-2. The operations of the ideal encoder and decoder mirror each other, with eeD representing a time shift, or latency. This mirroring implies, e.g., that an underflow of the encoder corresponds to an overflow of the decoder. Additionally, in this example, note that time is in units of video fields.

It is important to recognize that any real encoder, not being instantaneous, may begin writing bits of pic n into eBuff early, i.e., before T(n). However, it must not begin to read them from eBuff and write them to the decoder (or to the channel) before T(n). To do so would risk overflowing vBuff. If bits enter vBuff prematurely, they may enter before the VBV has had the opportunity to make room for them by removing earlier pics from its buffer.

If the only non-ideal aspect of the encoder is that bits are put into eBuff early, then the bits won't be read out early. (While this could cause eBuff to overflow, that is not our concern. It just means that eBuff must be larger than vBuff, which is probably true for all real encoders). The reason bits of pic n won't be read out early, i.e., before T(n), is that bits from pic T(n-1) won't be fully read out before T(n). If that would otherwise happen, the encoder pads the encoded bitstream with null bits to prevent it.

Certain encoders normally complete a pic a few milliseconds early. In film mode, however, it may complete a full field-time early, approximately 17 ms. This occurs because certain encoders, unlike the VBV, insists on frame-alignment. Consequently, when the encoder completes the coding of a pic early, it may begin to code the next one early.

When encoding begins early, bits are put in eBuff early, creating a risk of reading them out and writing them to the decoder prematurely. As mentioned above, this risks overflowing the vBuff.

When coding starts a few ms early, the number of bits that can be put prematurely into eBuff is small, in part, because the encoder really doesn't start writing bits so soon. However, when coding starts a full field early, the number of bits entering eBuff prematurely can be substantial. Still, as argued above, the null-bit padding should prevent them from being read out prematurely. However, certain encoders remove these null bits before they enter eBuff, and then the risk of vBuff overflow is serious.

Inaccuracies in controlling the bitrate can also cause bits of pic n to be written from eBuff before T(n), even if null bits are not removed. This can happen if the bitrate is momentarily high, allowing all of the bits from pic n−1 to be written out before T(n).

A variable maxBits is calculated and used to control reading bits out of eBuff. During normal operation, maxBits is the number of bits in eBuff when the picture ends. Then, bits are readout of eBuff and written to the remote decoder until maxBits are read out, at which time reading out of bits from eBuff is disabled.

When a picture ends on time, i.e., at Texp, maxBits is the number of bits in eBuff at Texp.

When a picture ends early, maxBits is an estimate of the number of bits that would be in eBuff had the picture ended on time. This estimate is made at Texp, and it is the number of bits in eBuff at that time, less the number of bits that entered eBuff prematurely. The latter is the number of bits entering eBuff between the time the picture ended and Texp. Thus:

$$\text{maxBits} = \text{eBuff} - \text{newBits}, \tag{1}$$

where newBits=wPtr−wPtrPrev and wPtr is the eBuff write pointer position at Texp and wPtrPrev is the write pointer position at the time that the end of the picture occurs.

When a picture ends late, maxBits is determined at the time the picture ends. It is simply the number of bits in eBuff at the time the picture ends, since no bits have as yet entered eBuff prematurely. Thus:

$$\text{maxBits} = \text{eBuff}. \tag{2}$$

There is one exception that applies to the interval between Texp and the end of late pictures. During this interval bits are entering eBuff late, and it is permissible for bits of those pictures to be read out of eBuff. Indeed, since there is no risk of bits entering eBuff prematurely, there should be no constraint on reading out bits. During this interval, the maxBits mechanism is essentially disabled and bits are allowed to be read out of eBuff.

Note that maxBits is always set at time Texp, and also when late pictures end.

DESCRIPTION OF PREFERRED EMBODIMENTS

FIG. 1 shows, in simplified block diagram form, an MPEG-like encoder that may employ embodiments of the invention. Specifically shown is bandwidth allocator 101, which in one example, supplies a variable bit rate (VBR) for video encoding, video_rate. The encoding rate is supplied to MPEG-like encoder 103 and, therein, to bit rate controller (BRC) 104, video_rate integral unit 102 and xsBits unit 105. BRC 104 models the video decoder buffer 110, vBuff, to ensure its integrity. The BRC 104 tries to adjust the quantization so that mBuff, its model of vBuff, is never in danger of overflow or underflow. The bit content of mBuff, hereinafter mBuff, is supplied to xsBits unit 105. Encoder 103 also supplies eeD to video_rate integral unit 102. A uncompressed video signal to be encoded is also supplied to encoder 103. A compressed video signal is supplied from encoder 103 to encoder buffer 106, eBuff. The bit content of eBuff 106, hereinafter eBuff, is also supplied from encoder 103 to xsBits unit 105. Encoder 103 supplies a pic-end signal, a write pointer (wPtr) position indication, and the eBuff level (eBuff) to maxBits calculator unit 109. A control signal output from maxBits calculator unit 109 is supplied to control transmission control (B) 108. Operation of maxBits calculator unit 109 in generating control signal maxBits is described below in conjunction with the flowchart shown in FIG. 2. The compressed video signal is supplied from encoder buffer 106 via transmission control (A) 107 and transmission control (B) 108 for transmission to a remote hypothetical decoder 111 via hypothetical decoder buffer 110, vBuff. Video_rate integral unit 102 is responsive to video_rate and eeD to generate drainIntegral. Note that drainIntegral is in units of bits. xsBits unit 105 is responsive to video_rate, drainIntegral, the bit content of mBuff and the bit content of eBuff to generate a control signal for controlling operation of transmission control 107. Thus, as such, xsBits unit 105 is a control signal generator. As indicated above, if xsBits exceeds a prescribed threshold, in this example, zero (0), transmission control 107 stops the transmission of bits from encoder buffer 106, i.e., eBuff, to transmission control (B) 108 and, then, to a remote decoder 111 via decoder buffer 110. Also, as described above, decoder buffer (vBuff) 110 is a remote decoder buffer and decoder 111 is its associated remote decoder. Decoder 111 yields the desired uncompressed video signal at the remote location. Since vBuff is in a video decoder buffer 110 its bit content is not directly available to encoder 103. Thus, as described above, the bit content of vBuff is inferred.

Transmission control (B) 108 also controls reading out bits from encoder buffer 106, i.e., eBuff, in response to the variable maxBits from maxBits calculator 109. To this end, a value maxBits is supplied to transmission control (B) 108 which decrements the supplied value of maxBits for each bit read out and written to remote decoder buffer 110. When the value of maxBits reaches zero (0), i.e., maxBits≦0, reading out of bits is disabled.

Further details of elements 101–107, 110 and 111 may be found in U.S. patent application Ser. No. 09/539,059, filed on Mar. 30, 2000, now U.S. Pat. No. 6,674,797 issued Jan. 6, 2004, which is assigned to the assignee of this application.

Figure 2:
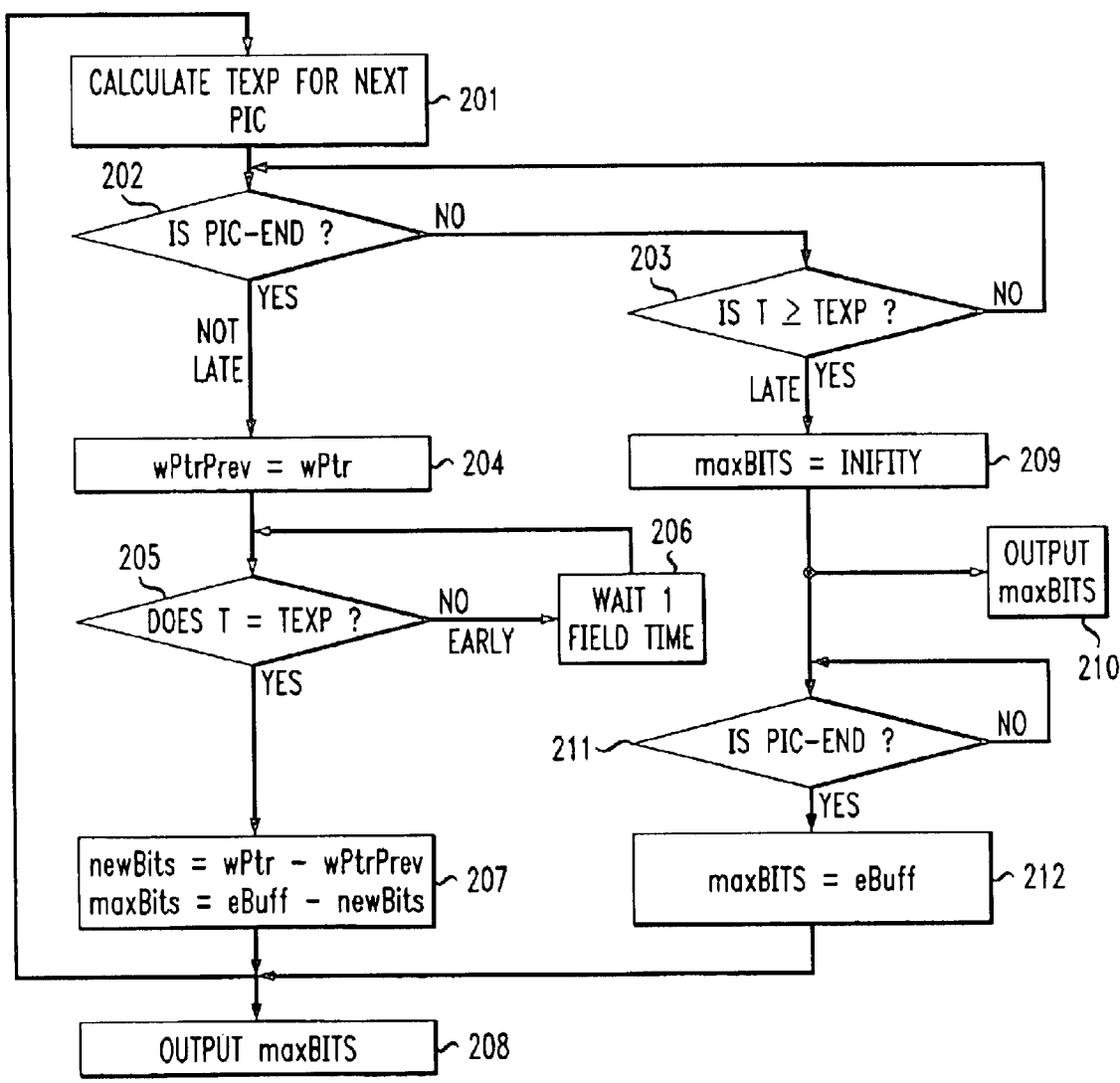
FIG. 2 is a flow chart illustrating steps in the encoder buffer bit reading out process in accordance with an embodiment of the invention.

FIG. 2 is a flow chart illustrating steps in the encoder buffer bit reading out process in accordance with one embodiment of the invention. The maxBits calculation process is started in step 201 by calculating Texp for the next picture (pic) to be transmitted. Again, Texp is the time at which pic is expected to end. Step 202 tests to determine whether pic-end has been received from encoder 103. If the test result in step 202 is NO, step 203 tests to determine whether T≧Texp. If the test result in step 203 is NO, steps 202 and 203 are repeated until either step 202 yields a YES result or step 203 yields a YES result. If step 202 yields a YES result the pic-end is not late, and step 204 sets wPtrPrev=wPtr. Again wPtr is the write pointer position for encoder buffer 106 and is supplied from encoder 103. Thereafter, step 205 tests to determine if T=Texp. That is, whether the current time is equal to the time that the pic is expected to end. If the test result in step 205 is NO, pic ends early and step 206 causes a one (1) field wait interval. Again, as indicated above, time is in terms of units of field intervals. Then, step 205 and, if necessary, step 206 are repeated unit step 205 yields a YES result. Step 207 then calculates maxBits, in accordance with equation (1). Note, however, that if the pic-end is on time that newBits=0 and maxBits=eBuff. Step 208 outputs the maxBits value to transmission control (B) 108 and control is returned to step 201.

Returning to step 203, if it yields a YES result the pic-end is late, and step 209 sets maxBits to infinity. Note that infinity as used here is not a number, but merely indicates that bits can be continually read from eBuff 106. Of coarse this only occurs until maxBits is again reset to a finite number. Step 210 outputs maxBits to transmission control (B) 108 and control is passed to step 211. Then, step 211 tests to determine whether pic-end has been received, i.e., that the picture has ended. Step 211 is iterated until it yields a YES result and pic-end has been received. Then, step 212 determines maxBits, in accordance with equation (2) above. Thereafter, step 208 supplies the value of maxBits to transmission control (B) 108 and control is returned to step 201.

The above-described embodiments are, of course, merely illustrative of the principles of the invention. Indeed, a number other arrangements may be devised by those skilled in the art without departing from the spirit and scope of the invention. For example, embodiments of the invention may be implemented in hardware or in software in a digital signal processor or the like.

What is claimed is:

1. Apparatus for use in an encoder to ensure integrity of a hypothetical decoder buffer of a video buffer verifier comprising:

an encoder buffer including a bit content;

a transmission controller supplied with a representation of a prescribed number of bits for controllably inhibiting transmission of bits from said encoder buffer upon said prescribed number of bits having been read out from said encoder buffer; and a calculator for generating said representation of said prescribed number of bits in accordance with a prescribed relationship dependent on said encoder buffer bit content, and an end of picture indication, said calculator including a detector for determining whether said picture has ended at an expected time and said calculator being supplied with a first indication from said detector of said encoder buffer bit content when said picture actually ended and a second indication from said detector of said encoder buffer bit content when said picture should have ended.

2. The apparatus as defined in claim 1 wherein said prescribed number of bits is said encoder buffer bit content when said detector indicates that said picture ends at said expected time.

3. The apparatus as defined in claim 1 wherein said detector further determines whether said picture has ended before said expected time, and wherein said prescribed number of bits is determined to be, in response to said first indication and said second indication, a number of bits in said encoder buffer bit content when said picture should have ended less any new bits written into said encoder buffer during an interval between when said picture actually ended to when said picture should have ended, when said detector has determined that said picture has ended before said expected time for said picture to end.

4. The apparatus as defined in claim 3 wherein said encoder buffer includes a write pointer having a position representative of the number of bits written into said encoder buffer, said write pointer position at the time said picture actually ended being said first indication and said write pointer position at the time said picture is expected to end being said second indication.

5. The apparatus as defined in claim 4 wherein said new bits written into said encoder buffer is equal to said second indication less said first indication.

6. The apparatus as defined in claim 1 wherein said detector further determines whether said picture has ended after said expected time, and wherein said transmission controller is essentially disabled from inhibiting transmission of bits from said encoder buffer during an interval from a time when said picture should have ended to a time when said picture actually ended, when said detector determines that said picture will end after said expected time.

7. The apparatus as defined in claim 6 wherein said prescribed number of bits is a number of bits in said encoder buffer bit content when said picture actually ended, when said detector has determined that said picture has ended after said expected time.

8. A method for use in an encoder to ensure integrity of a hypothetical decoder buffer of a video buffer verifier comprising the steps of:

storing bits in an encoder buffer;

controllably inhibiting transmission of bits from said encoder buffer in response to a representation of a prescribed number of bits upon said prescribed number of bits having been read out from said encoder buffer; and generating said representation of said prescribed number of bits in accordance with a prescribed relationship dependent on a number of bits stored in said encoder buffer, and an end of picture indication, determining whether said picture has ended at or before an expected time and utilizing a first indication of said number of bits stored in said encoder buffer when said picture actually ended and a second indication of said number of bits stored in said encoder buffer when said picture should have ended.

9. The method as defined in claim 8 wherein said prescribed number of bits is said number of bits stored in said encoder buffer when said step of determining indicates that said picture ends at said expected time.

10. The method as defined in claim 8 wherein said step of determining further determines whether said picture has ended before said expected time, and wherein said step of generating includes a step of utilizing said first indication and said second indication to generate said representation of said prescribed number of bits as being a number of bits stored in said encoder buffer when said picture should have ended less any new bits written into said encoder buffer during an interval between when said picture actually ended to when said picture should have ended, when said detector has determined that said picture has ended before said expected time for said picture to end.

11. The method as defined in claim 10 wherein said encoder buffer includes a write pointer having a position representative of the number of bits written into said encoder buffer, said write pointer position at the time said picture actually ended being said first indication and said write pointer position at the time said picture is expected to end being said second indication.

12. The method as defined in claim 11 wherein said new bits written into said encoder buffer is equal to said second indication less said first indication.

13. The method as defined in claim 8 wherein said step of determining further determines whether said picture has ended after said expected time, and wherein said step of controllably inhibiting transmission is essentially disabled from inhibiting transmission of bits from said encoder buffer during an interval from a time when said picture should have ended to a time when said picture actually ended, when said step of determining determines that said picture will end after said expected time.

14. The method as defined in claim 13 wherein said prescribed number of bits is a number of bits in said encoder buffer bit content when said picture actually ended, when said step of determining has determined that said picture has ended after said expected time.

* * * * *